May 24, 1966  B. K. LUNDE  3,252,333
ACCELEROMETERS
Filed April 10, 1961  3 Sheets-Sheet 1
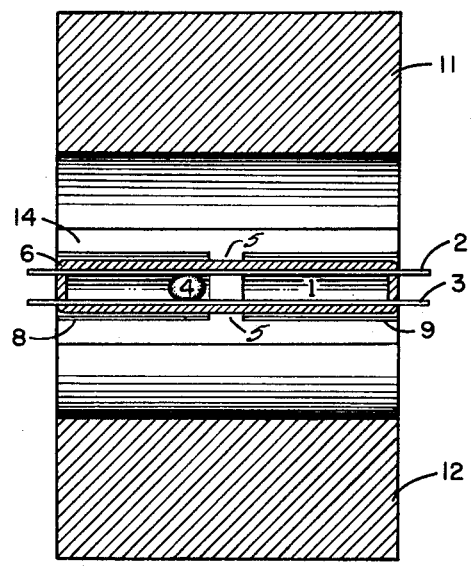
FIG. I
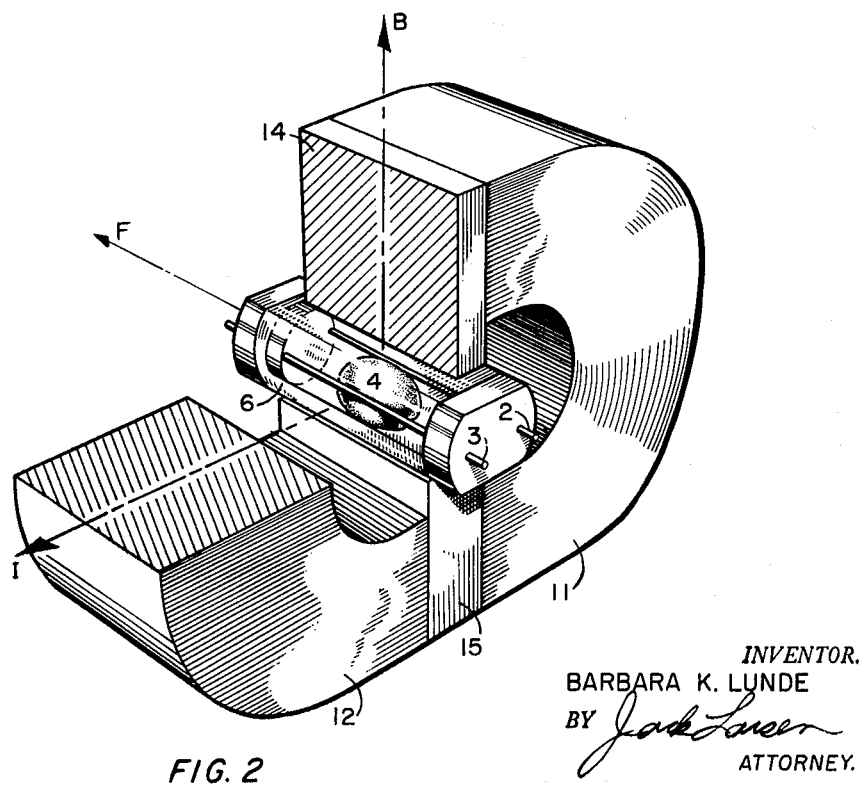
FIG. 2
INVENTOR.
BARBARA K. LUNDE
BY
ATTORNEY.

May 24, 1966  B. K. LUNDE  3,252,333
ACCELEROMETERS
Filed April 10, 1961  3 Sheets-Sheet 3

SERIES OF COMPENSATED PULSES; YIELDS ZERO AVERAGE FEEDBACK SIGNAL

SERIES OF UNCOMPENSATED PULSES INTERRUPTED BY A COMPENSATED PULSE;
NET NEGATIVE AVERAGE FEEDBACK SIGNAL

INVENTOR.
BARBARA K. LUNDE
BY Jack Larsen
ATTORNEY.

United States Patent Office 3,252,333
Patented May 24, 1966

3,252,333
ACCELEROMETERS
Barbara K. Lunde, Ames, Iowa, assignor to Massachusetts Institute of Technology, Cambridge, Mass., a corporation of Massachusetts
Filed Apr. 10, 1961, Ser. No. 102,065
15 Claims. (Cl. 73—516)

This invention relates to accelerometers more particularly to accelerometers of small size and weight suitable for use in space probes and other vehicles adapted for travel in interplanetary space.

Given sufficiently accurate accelerometers and gyroscopes the guidance of rockets in space travel may be accomplished without reference to external information. However, since all gyroscopes and accelerometers are to some degree inaccurate, reference to externally derived information is generally necessary in all space vehicles. The acquisition of information from external sources by radar and star sighting requires a substantial expenditure of energy. Accordingly the continuous reliance on external information is sought to be minimized in the design of space craft. Gyroscopes and accelerometers which are small in size, light in weight, and require a minimum of power are desired to fill in between external observations in space vehicle systems. The maintenance of angular orientation by reference to stars is relatively straightforward and practical; however measurements of position by external observation are relatively cumbersome, particularly the derivation of acceleration from such measurements. Accordingly, accelerometers having desirable properties for space vehicles are much to be desired.

Proposals for space craft frequently incorporate exotic propulsion systems such as electronic ion jets which produce thrusts with very high specific impulse but relatively low absolute value. Accordingly for space travel, accelerometers which are accurate and sensitive to accelerations in the range much below the level of 1 g are necessary. It is an object of this invention to provide a light weight and compact accelerometer of high intrinsic accuracy. It is a further object of this invention to provide a precision accelerometer which is easy to produce and relatively inexpensive. Further objects and advantages of the invention will be apprehended from the appended figures of which:

FIG. 1 is a pictorial representation partially in section of an embodiment of the invention, FIG. 2 is a pictorial representation of the force balance system of the invention, FIG. 3 is a cross section of a typical accelerometer tube assembly, FIG. 3 is a cross section of a typical accelerometer tube assembly, FIG. 4 is a graph indicating the dependence of the accuracy of the instrument upon the precision of the shape of the accelerometer tube bore, FIG. 5 is a schematic block diagram of an accelerometer system employing continuously variable feedback current, FIG. 6 is a schematic diagram of an accelerometer system employing pulses of current in the forcing circuit, FIG. 7A is a graph of the current in the forcing circuit of FIG. 6 at a condition of zero acceleration component and FIG. 7B is a graphical representation of the current when an acceleration component is present.

As shown in FIG. 1 the accelerometer comprises an electrical circuit 1 made up of an input wire 2, an output wire 3 and a liquid metal droplet 4. Wires 2 and 3 are located on diametrically opposite sides of a cylindrical insulating tube 6. The ends of the tube 6 are sealed to enclose the wires, the liquid metal droplet and an inert gas. The tube may be of glass, quartz, or ceramic composition. Metal electrodes 8 and 9 are applied to the outer surface of the tube leaving a central uncoated gap 5 the width of which is small compared to the diameter of the droplet. In operation, the droplet 4 is centrally positioned in this uncoated section. In this position, the capacitance between the droplet 4 and the electrode 8 is equal to the capacitance between the droplet 4 and the electrode 9. Displacement of the droplet upsets this capacitive balance. Permanent magnets 11 and 12, pole piece 14 and another pole piece 15 (not shown) are positioned relative to the tube to produce a homogeneous magnetic field B at the center of the tube 6 which is substantially perpendicular to the plane of the loop 1. Assuming this magnetic field to be directed into the paper, current flowing into the wire 2, through the droplet 4 and out of the wire 3 produces in the droplet a force tending to drive it to the right that is toward the electrode 9.

FIG. 2 represents the interaction between the magnetic field B, the current I and the resulting force on the droplet 4. Flow through the droplet 4 of an appropriate value of the current I will exert a force F on the droplet which precisely balances the component of specific force along the axis of the tube so that the droplet may remain centered in the tube regardless of the motion of the supporting structure. It is most desirable in an intrument of this type that the instrument be sensitive to only one component of acceleration, that is, that the sensitivity to acceleration along the axis of the tube 6 should be the same regardless of acceleration components transverse to the axis of the tube 6. It is also desired that the required balancing current be accurately proportional to acceleration over a wide range of accelerations. Second-order effects resulting in an undesired cross coupling and non-linearity may arise from changes in the shape of the droplet as acceleration forces are applied. The design choice of a liquid metal with high surface tension tends to preserve the sphericity of the drop, and reduce errors of this kind. Calculations show that a force of 10 g's will cause a mercury droplet one fifth of a millimeter in diameter to deform or flatten less than $10^{-5}$ centimeter. A droplet of mercury slightly larger than the inside diameter of the tube 6 has been found generally satisfactory as the inertial mass for this accelerometer.

The requirement that the droplet be an excellent conductor limits the choice of material to a liquid metal. In addition to mercury, gallium and sodium-potassium alloy NaK may be considered as materials for the droplet. While these alternative materials have the desirable property of relatively low density, mercury is preferred because of its lesser chemical reactivity and because of a greater experience with mercury in the production of millions of thermometers, mercury switches and the like. Commercially developed techniques for coating the inside surface of glass tubes remove any tendency for the mercury to stick to the glass and minimize resistance to droplet motion.

The design requirements for a satisfactory tube are few. It must hold the mercury in an inert atmosphere and maintain the position of the wires parallel. Various methods of fabricating a suitable tube are well-known in the art. Successful experimental models have been produced with fused glass assemblies similar to mercury switches. A perfectly shaped tube has an inside diameter that is constant over substantially the entire length of the tube. The graph shown in FIG. 4 illustrates the response curve 41 of an accelerometer with a straight tube, and for two inaccurately shaped tubes, curves 42 and 43, for barrel shaped and hourglass shaped inaccuracies respectively. The figure tends to illustrate that, while a certain amount of barrel-type inaccuracy may be tolerable, hourglass inaccuracy leads to difficulties in calibration and adjustment.

While either an electromagnet or a permanent magnet may be used to generate the magnetic field, a permanent magnet is preferred because it requires no power, is less complicated and is probably more stable, and may be assembled in a somewhat smaller package. An aluminum-cobalt-nickel permanent magnet known in the trade as Alnico VI with temperature control of ±2 degrees centigrade at about 51 degrees centigrade will produce a magnetic field with adequate stability.

Within the tube the wires 2 and 3 of the assembly must be straight, dimensionally stable and of a composition that will not amalgamate with mercury. So called "Van Kuren" tungsten carbide wires meet all of these requirements. They are straight, stiff, accurately dimensioned wires which are commonly used for gaging. Their straightness insures accuracy and minimizes the resistance to droplet movement.

An accelerometer, as just described, may be used with analog closed-loop circuitry as shown in FIG. 5. The acceleration of the mercury droplet 4 produces a displacement of the droplet 4, and a resulting upsetting of the capacitance balance. Appropriate circuitry, as is well-known, detects in a displacement signal generator 51 this change in capacitance balance and produces an error signal which is amplified in a servo unit operational amplifier 52. The output 53 of this amplifier is a measure of the acceleration, measurable by a meter 54. It also is fed back to a current generator 56 which generates a current in the accelerometer loop 1 which is positive or negative depending upon the indicated displacement of the drop and proportional to the indicated acceleration whereby the drop tends to be held in its balance position.

More specifically, in the analogue embodiment, the acceleration measurement appears in the form of a meter indication 54. Without axial acceleration and dithering the droplet is at rest in gap 5 and displacement generator 51 emits no error signal. Where an axial component of acceleration forces the mercury droplet to accelerate with respect to the tube the droplet is displaced minutely from its known position and the displacement signal generator then has an output voltage different from zero. This signal causes the rest of the electronic system to generate a current in the feedback loop comprising the wires 2 and 3 and droplet 4. The current interacts with the magnetic field and produces a restoring force along the axis of the tube. Typically, where the current responds quickly to the displacement, the droplet continues in a state of quasi-equilibrium, or damped oscillation about gap 5 or null notwithstanding the forces of axial acceleration. Since the magnetic field is constant, the current required to diminish the error is proportional to the acceleration. Increase in the current speeds the response and also tends to cause oscillation. Damping of the droplet's oscillation around gap 5 is a function of those factors effecting the droplet's velocity in the tube, such as the pressure of the internal inert gas. Where damping is high, oscillation is kept to a minimum and the droplet after responding to acceleration relatively soon falls into a state of following its null, being on one side of gap 5. Where, however, damping is low, such as where gas pressure is low, oscillation is increased and under proper conditions is, moreover, continuous so long as motion reinforcing current continues to pass through the droplet. A lightly damped device has the major advantage of being more sensitive as it is not subject to "stiction." "Stiction" is a term for the type of friction that resists first motion of a body, the tendency for the body to stick to its support. Although slight, there is observable "stiction" between a mercury droplet and a tube of the kind described. If the accelerating force is not great enough to overcome stiction the droplet does not move relative to the tube, and in an analogue device such as the present one, no acceleration is measured. An instrument with this characteristic is said to be insensitive to small amounts of acceleration. In an underdamped device where amplified restoring force operates on the droplet forcing it back and forth, the stiction is overcome. Such a device is considerably more sensitive to acceleration. However, in the analogue device, whether it be damped or underdamped, the integrated current is still a function of acceleration. It is apparent that the embodiment of FIG. 5 may be proportioned so that the droplet comes to rest in the steady state or may be proportioned so that the droplet may continue to oscillate about the null position. Which of these conditions will occur, of course, depends on the amount of damping present in the tube, as stated before, the underdamped device is appreciably more responsive to minute amounts of acceleration.

The droplet accelerometer is readily adaptable to digital pulsed forcing techniques in the system indicated in FIG. 6. A current precisely constant in amplitude is passed through the droplet 4 at all times from a current generator 61. A switching device 62 under control of a clock frequency source 63 and the displacement detecting circuitry 64 switches the polarity of the feedback current, thus the heating effect of the current is at all times constant and independent of the measure acceleration. The counter 65 is reversible. It counts the clock signal pulses in one direction for so long as the current feedback is negative and counts in the other direction for so long as the current is positive. The accumulated count on the counter is therefore a measure of the time integral of the acceleration component measured by the accelerometer.

Specifically, in the embodiment of FIG. 6 the algebraic sum of the output counts registered on counter 65 is proportional to the integral of the input acceleration (velocity change) acting along the axis of the tube. When mercury droplet 4 experiences no acceleration along the axis of tube 6 the ball necessarily oscillates about the null position of gap 5 because of the alternating character of the feedback restoring current emitted from switching device 62. Switching device 62 alternates the character of the D.C. current emitted from constant D.C. source 61 when the amplitude of the output signal generator 64 attains a pre-established positive or negative threshold level. Thus when the droplet's displacement is, for example, to the right of gap 5, sufficient to generate a displacement signal equal to the threshold positive level of the switching device, the signal emitted from device 62 switches from a constant negative value to a constant positive value. The reversal in the polarity of the feedback current reverses the direction of the electro-magnetic force opposing further displacement of the droplet from the null. Inertia, however, carries the droplet to a maximum displacement from the null before the droplet is forced to reverse in direction. The droplet then moves back past null until it reaches a point to the left of gap 5 at which the displacement signal equals the other threshold voltage level, in this example, the negative threshold voltage. At this time, the switching device 62 switches from a positive to a negative polarity whereby the current to the droplet is reversed and the direction of the electro-magnetic force reverses to oppose further displacement of droplet 4 to the left of its null position in gap 5. Generally there is a "dead" zone surrounding the null in which the displacement signal is below threshold.

The period during which the output signal of displacement signal generator 51 exceeds either of the forementioned threshold levels, that is, when displacement of droplet 4 to the right or to the left of gap 5 is greater than a predetermined amount, switching device 62 acts to connect clock 63 to counter 65. Counter 65 is reversible and, accordingly, registers the difference in the number of clock pulses it receives during each of the periods the output of generator 64 exceeds the positive or negative threshold level. When there is no acceleration along the axis of tube 6 the intervals during which droplet 4 is on one side or the other of the dead zone are equal. Consequently, the number of pulses received by counter 65 is the same for each of the respective excursions of droplet 4, and the net count registered by counter 65 is zero. When, however, there is an accelerating force acting on droplet 4, having a component along the axis of tube 6, the excursions of the droplet 4 are of unequal duration and counter 65 accordingly will display a registration other than zero. Thus, for example, when the tube is accelerating to the right the droplet tends to lag behind; and in its oscillation spends more time to the left of the null than it spends to the right. The difference in the number of pulses received by counter 65 during these two intervals is a measure of the acceleration of the tube. From the foregoing it is apparent that in the embodiment of FIG. 6 the droplet is constantly dithered about gap 5 when there is no acceleration. When acceleration occurs, the net average position of the droplet moves either to the right or to the left of the gap by a proportional amount and this change is reflected as a measure of acceleration in the readout of counter 65.

Figure 3:
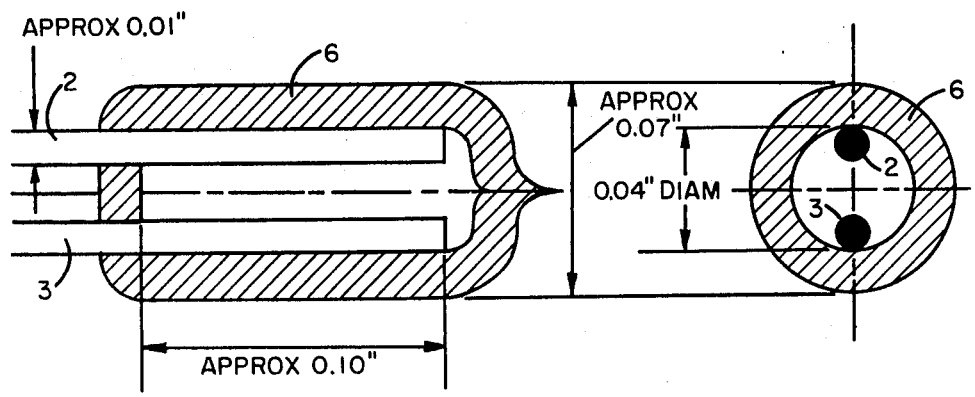
Figure 4:
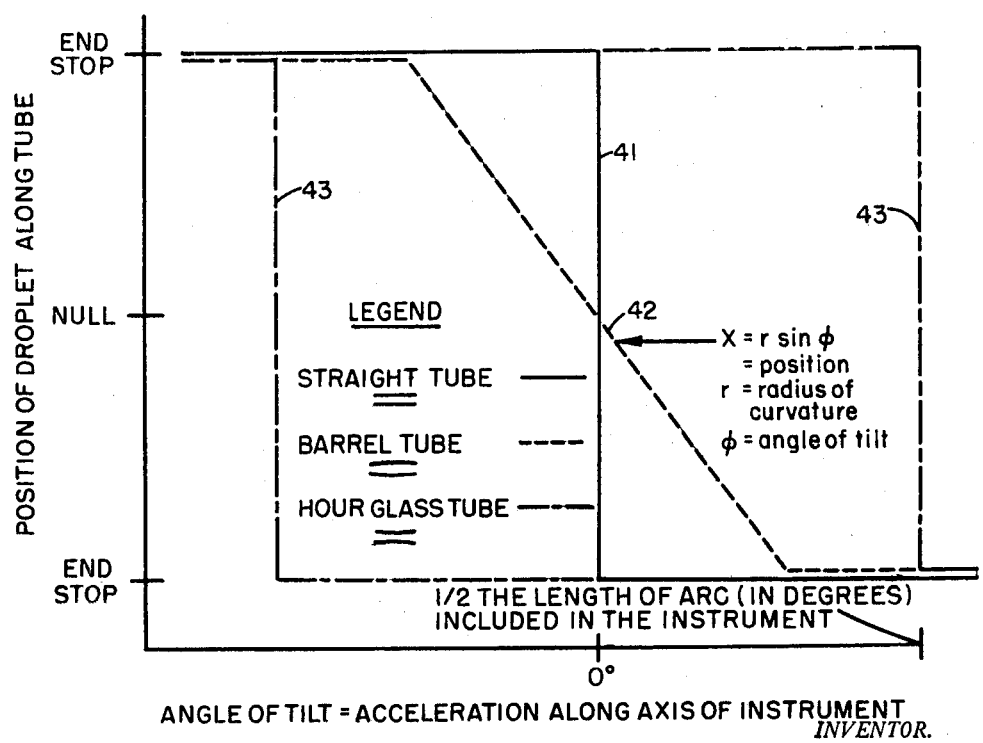
Figure 5:
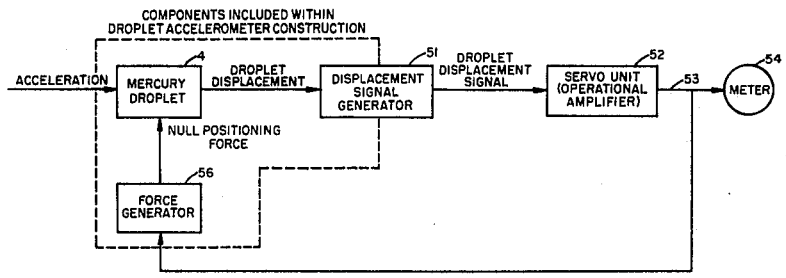
Figure 6:
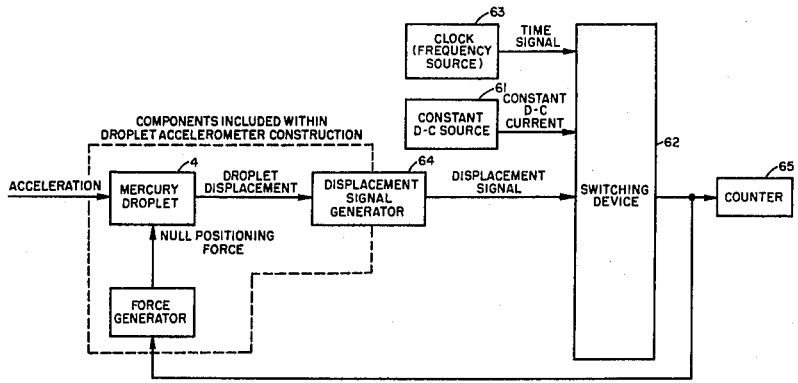
Figure 7A:
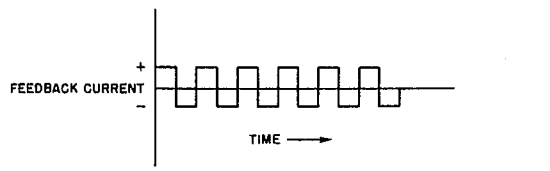
FIG. 7A represents the current flow averaging zero.
Figure 7B:
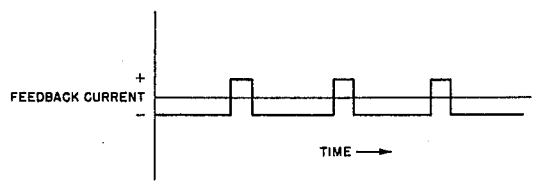
FIG. 7B represents current flow under acceleration.

An acceleration of 10 $g$'s is typical of required upper range for an accelerometer of this type. To measure an acceleration of 10 $g$'s, the accelerometer must have a forcing device capable of accelerating the droplet to 10 $g$'s. The acceleration imparted to the droplet depends on the mass of the droplet, the magnitude of the current, the distance the current travels through the droplet, and the magnitude of the magnetic field, that is:

$$a \propto \frac{BId}{m}$$

where $a$ is equal to the acceleration imparted to the droplet by the forcing device, B is the magnetic field on the droplet, I is the current through the droplet perpendicular to the magnetic field, $d$ is the distance the current travels through the droplet, $m$ is the mass of the droplet. In terms of the density $s$ of the liquid $$a \propto \frac{BI}{sd^2}$$

Taking as a reasonable practical stable value for the field 5,000 gauss, 1 ampere as a reasonable value for the current, and the density of mercury, 13.6 gm./cm.$^3$, the relation between acceleration $a$ in $g$ units and the diameter $d$ of the droplet in inches becomes $$a = \frac{0.009}{d^2}$$

The quantity $d$ is substantially a measure of the diameter of the droplet or of the spacing between the wires which are of the same order of magnitude and for this example may be considered equal. For an acceleration of 10 $g$'s the calculated tube diameter is approximately 0.03 inch. For this value of inside diameter, the gap between pole pieces would measure approximately 0.04 inch by 0.04 inch by .12 inch and the weight of an Alnico VI magnet producing the required magnetic field in a gap of these dimensions is 0.04 ounce and its volume is 0.01 cubic inch. These calculations, which must be recognized as approximate and illustrative, are based upon magnetic properties as defined by the permanent magnet handbook published by the Crucible Steel Co. Other arrangements, changes in scale or choices of materials will be recognized as falling within the scope of the invention.

Having thus described the invention what is claimed as new is:

1. A source of magnetic field, a pair of electrical conductors having substantially parallel portions within said field and lying in a plane substantially perpendicular to said field, a liquid metal droplet joining said conductors and free to move there along, an electrode extending in proximity to said droplet so that the capacitance between said droplet and said electrode varies as said droplet moves along said parallel conductors, a displacement signal generator which detects changes in capacitance between said electrode and said droplet, and current generator means connected to said displacement signal generator and responsive to the output of said displacement signal generator and said means further coupled to said parallel conductors this coupling being such that the force produced by the flow of current from said current generator means through said droplet tends to resist the motion of said droplets detected by said displacement signal generator.

2. A combination as defined by claim 1 characterized in that said parallel conductors are fixed on diametrically opposite sides of an insulating tube.

3. A combination as defined by claim 2 wherein said electrode comprise a conducting coating on a portion of the outside surface of said insulating tube.

4. A combination as defined by claim 2 wherein said tube is a cylindrical vitreous tube.

5. A combination as defined by claim 4 wherein said liquid metal droplet is of mercury.

6. An accelerometer system comprising in combination, a source of magnetic field, a pair of conductors having substantially parallel portions within said field and lying in a plane substantially perpendicular to said field, a liquid metallic droplet joining said conductors and free to move there along, an electrode extending in proximity to said droplet, means for generating a signal which is a measure of motion of said droplet connected to said droplet and to said electrode, source means for producing a constant current, switching means connecting said source means and said parallel conductors and means for controlling said switching means responsive to said signal to reverse the flow of said constant current through said parallel conductors.

7. A combination as set out in claim 6 further characterized in that said parallel conductors are fixed on diametrically opposite sides of an insulating tube.

8. A combination as defined by claim 7 wherein said electrode comprises a conductive coating on a portion of the outside surface of said insulating tube.

9. A combination as set out in claim 7 wherein said liquid metallic droplet is of mercury.

10. An accelerometer system comprising in combination, a source of magnetic field, a pair of parallel wires located substantially perpendicular to said magnetic field, a droplet of liquid metal interconnecting said pair near a balance position within said field circuitry, means for producing an electrical error signal, which is a result of displacement of said droplet from said position, a generator means for generating a current through said pair and said droplet which is positive or negative as said displacement is one or the other of said position; and connecting means for coupling said generator means to said wires, the coupling being such that force produced by the flow of said current through said droplet in coaction with said magnetic field tends to resist displacement of said droplet from its balance position.

11. A combination as defined by claim 10 wherein the conducting material is a liquid metal.

12. A combination as defined in claim 11 wherein said liquid metal is of mercury.

13. An accelerometer system comprising in combination, a source of magnetic field, a droplet of liquid metal, a pair of conducting wires located substantially perpendicular to the magnetic field upon which said droplet may ride, a signal displacement generator for detecting the position of said droplet and which generates a signal that is a function of said position, a source of constant current, switching means connecting said source of constant current to said pair of wires and means for controlling said switching means responsive to said displacement signal generator to reverse the flow of said constant current to said pair of wires.

14. A combination as set forth in claim 13 wherein said liquid metal is of mercury.

15. An accelerometer system comprising in combination a source of magnetic field, a droplet of liquid metal, a pair of conducting wires located substantially perpendicular to the magnetic field and upon which said droplet may ride, a displacement signal generator for detecting the position of said droplet and which generates a signal that is a function of said position, a constant current generator, a clock pulse generator, a switching device said switching device coupled to said displacement signal generator and further coupled to the constant current generator and also coupled to said pair of conducting wires whereby said switching device interconnects said current generator and said wires, said switching device being further coupled to said clock pulse generator and to a pulse counter whereby said switching device provides a path through for the pulse signals being emitted from said pulse generator to said counter said switching device further operating to reverse the polarity of the current being coupled from said current source to said conducting wires each time the output signal from the displacement signal generator attains each of two particular amplitude levels.

References Cited by the Examiner

UNITED STATES PATENTS

| 2,591,921 | 4/1952 | Cosgriff et al. | 73—516 |
| 2,869,851 | 1/1959 | Sedgfield et al. | |
| 2,979,960 | 4/1961 | Johnson | 73—517 |
| 3,024,662 | 3/1962 | Ryan. | |
| 3,121,336 | 2/1964 | Riordan | 73—516 |

FOREIGN PATENTS

| 708,228 | 4/1954 | Great Britain. |
| 715,750 | 9/1954 | Great Britain. |

RICHARD C. QUEISSER, *Primary Examiner.*

S. FEINBERG, SAMUEL BOYD, B. A. BORCHELT, *Examiners.*

JAMES J. GILL, L. L. HALLACHER, V. R. PENDEGRASS, *Assistant Examiners.*